(12) United States Patent
Lee

(10) Patent No.: US 6,272,006 B1
(45) Date of Patent: Aug. 7, 2001

(54) HINGE DEVICE FOR A PORTABLE COMPUTER

(75) Inventor: Jin Hyup Lee, Kyunggi-do (KR)

(73) Assignee: SamSung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/073,059

(22) Filed: May 6, 1998

(30) Foreign Application Priority Data

May 6, 1997 (KR) .................................................. 97-17227

(51) Int. Cl.[7] ................................. G06F 1/16; H05K 5/00
(52) U.S. Cl. ............................................... 361/681; 16/342
(58) Field of Search .................................... 361/681, 682; 16/342, 223, 337

(56) References Cited

U.S. PATENT DOCUMENTS

| | | | |
|---|---|---|---|
| 4,730,364 | | 3/1988 | Tat-Kee . |
| 5,077,551 | * | 12/1991 | Saitou ................................... 340/700 |
| 5,081,742 | * | 1/1992 | Kobayashi .............................. 16/337 |
| 5,173,837 | * | 12/1992 | Blackwell et al. .................... 361/380 |
| 5,195,213 | * | 3/1993 | Ohgami et al. ......................... 16/342 |
| 5,473,794 | * | 12/1995 | Kobayashi .............................. 16/337 |
| 5,500,982 | | 3/1996 | Hosoi . |
| 5,507,072 | * | 4/1996 | Youn ...................................... 16/261 |
| 5,636,102 | | 6/1997 | Fujino et al. . |
| 5,754,395 | * | 5/1998 | Hse et al. .............................. 361/680 |
| 5,844,774 | * | 12/1998 | Gushiken et al. ..................... 361/681 |

* cited by examiner

Primary Examiner—Lynn D. Feild
(74) Attorney, Agent, or Firm—Robert E. Bushnell, Esq.

(57) ABSTRACT

A pivot device for portable computers is provided that may be constructed using a pivot bearing, located at the rear edge of a main body of the portable computer and a pivot member that is fastenably attached to a display housing. Thus, the display housing is rotatably connected to the main body. The pivot member may be constructed using both a lower support part, that is mounted to the lower portion of the display housing, and a side support part that extends radially away from the hinge axis to fastenably attach to the side portion of the display body. In the second embodiment of this invention, the side support part of the pivot member has a hook that engages the inner surface of the side wall in the display housing.

The pivot device uses a pivot member that effectively distributes the weight of the display body, that effectively prevents the pivot shaft of the pivot member from being overloaded by the weight of the display body even when the display body is equipped with a large-sized LCD panel, and that prevents the display housing from being unexpectedly distorted or deformed during an opening or closing action of the display body.

18 Claims, 8 Drawing Sheets

HINGE DEVICE FOR A PORTABLE COMPUTER

CLAIM OF PRIORITY

This application makes reference to, incorporates the same herein, and claims all rights accruing thereto under 35 U.S.C. §119 through my patent application entitled Pivot Device and Portable Computer With the Same earlier filed in the Korean Industrial Property Office on the day of May 6, 1997 and there duly assigned Serial No. 1997/17227.

BACKGROUND OF THE INVENTION

1. Field of the Invention

The present invention relates to a pivot device, located at the junction between a portable computer's display body and main body, for a portable computer and, more specifically, to a pivot device that more effectively supports the weight of a liquid crystal display panel and prevents the distortion or deformation of the display housing that occurs during the opening and closing process.

2. Background Art

Liquid crystal display (LCD) panels are commonly used with portable computers because of their compact design. However, the weight of LCD panels often leads to a weakening of the hinge mechanism that connects the display body to the main body of the portable computer. This problem has become more common as the size and the weight of the LCD display panels used in portable computers increases.

Different techniques for pivotally mounting housings containing LCD display panels to the main body of portable computers are shown, for example, in U.S. Pat. No. 5,636,102 to Fujino entitled Portable Information Processing Apparatus with Hinge for Enlarged LCD Display, U.S. Pat. No. 5,566,048 to Esterberg entitled Hinge Assembly for a Device Having a Display, U.S. Pat. No. 5,507,072 to Youn entitled Hinge Securement Device for a Portable Computer, and U.S. Pat. No. 5,500,982 to Hosoi entitled Hinge Mechanism for Portable Electronic Apparatus. Hinges used in the contemporary art fail to provide a means of better distributing the load of a LCD display panel to prevent the separation of the front of a display panel housing from the LCD display panel. This is caused by the deformations incurred during the opening and closing of the portable computer.

As such, I believe it may be possible to improve on the contemporary art by providing a hinge that reduces the deformation caused by repetitive opening and closing of the portable computer, that avoids the separation of the front of the display panel housing from the liquid crystal display, that prevents the increase in vibrations caused by permanent deformation of the display housing, and that more evenly distributes the weight of a liquid crystal display panel.

SUMMARY OF THE INVENTION

Accordingly, it is an object of the present invention to provide an improved hinge device for a portable computer.

It is another object to provide a hinge device for a portable computer that reduces the deformations caused by the repetitive opening and closing of the display panel on the portable computer.

It is still another object to provide a hinge device for a portable computer that avoids the separation of the front of the display panel housing from the liquid crystal display panel.

It is yet another object to provide a hinge device for a portable computer that prevents an increase in vibrations caused by the permanent deformation of the display housing.

It is still yet another object to provide a hinge device for a portable computer that more evenly distributes the weight of a liquid crystal display panel.

To achieve these and other objects, a pivot device for portable computers is provided that may be constructed using a pivot bearing, located at the rear edge of a main body of the portable computer and a pivot member that is fastenably attached to a display housing. Thus, the display housing is rotatably connected to the main body. The pivot member may be constructed using both a lower support part, that is mounted to the lower portion of the display housing, and a side support part that extends radially away from the hinge axis to fastenably attach to the side portion of the display body. In the second embodiment of this invention, the side support part of the pivot member has a hook that engages the inner surface of the side wall in the display housing.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE DRAWINGS

Figure 1:
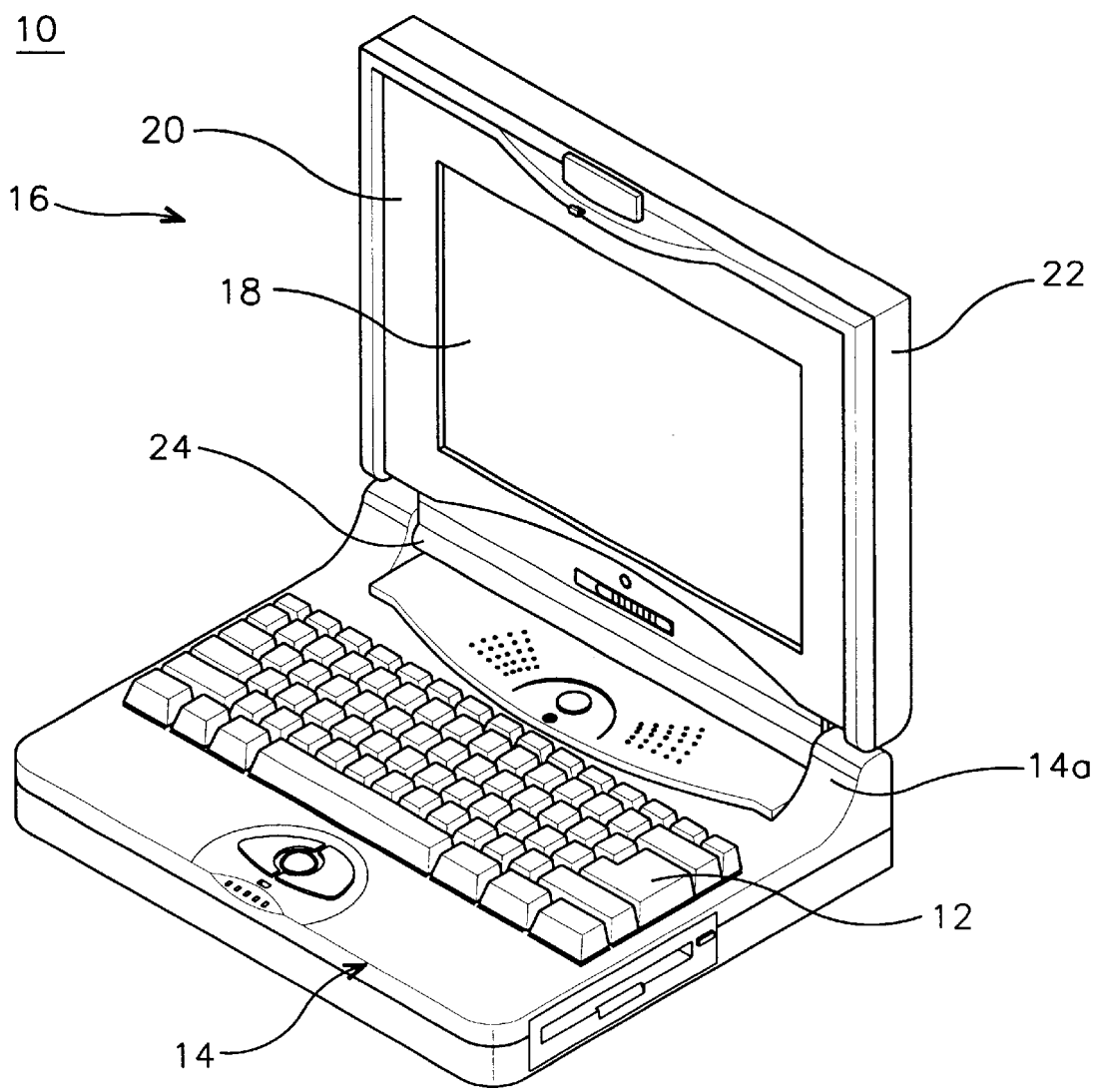
FIG. 1 is a perspective view of a portable computer with an openable display body.

Turning now to the drawings, FIG. 1 illustrates a portable computer with an openable display body. Portable computer 10 may be constructed using main body 14 and openable display body 16 that is coupled to the main body. Main body 14 provides an inner area for a Central Processing Unit (CPU) (not shown) and supports keyboard 12 on a top surface. Meanwhile, openable display body 16 is hinged to the rear edge of the main body 14 and carries LCD (liquid crystal display) panel 18. LCD panel 18 is electrically connected to the CPU of main body 14 and is designed for displaying input data in conjunction with the operation of keyboard 12.

Figure 2:
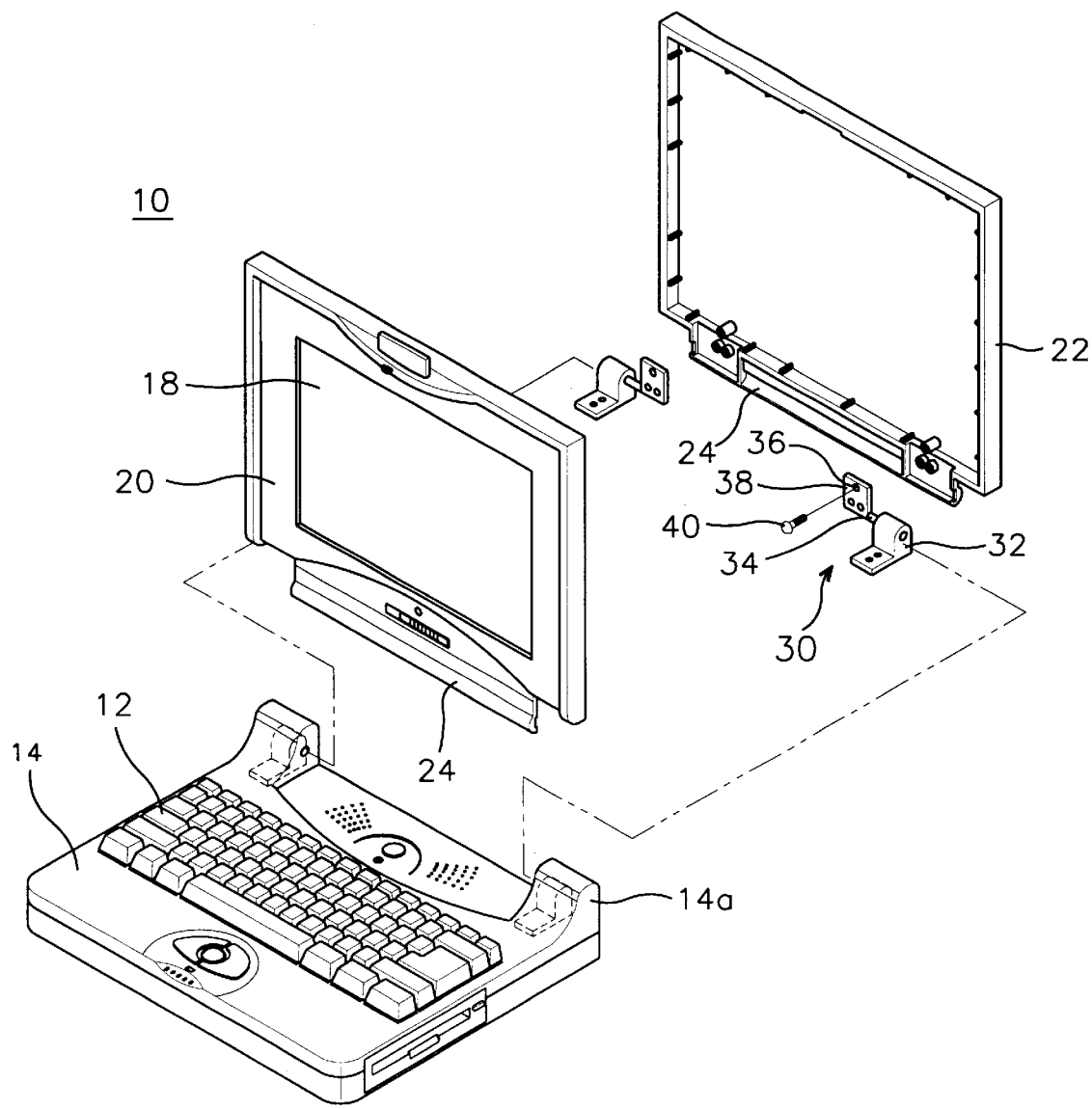
FIG. 2 is an exploded perspective view of a portable computer, showing the construction of a pivot device used by the portable computer.

As shown in FIG. 2, display body 16 may be constructed using front panel 20 and display housing 22. Front panel 20 supports the front portion of LCD panel 18, while display housing 22 supports the rear portion of LCD panel 18. Main body 14 is provided with an uplifted portion 14a, used for setting a pivot bearing, at each of the two rear corners. Front panel 20 and display housing 22 of display body 16 has a protrusion along the center of the lower edge. When panel 20 and housing 22 are assembled into a single structure, the two protrusions, that have the same configuration, are integrated into a single protrusion 24 that is positioned between the two uplifted portions 14a of main body 14. Protrusion 24 is hinged to the two uplifted portions 14a using two pivot devices 30, positioned along the rear edge of the main body at both ends. This allows display body 16 to be rotatably openable relative to main body 14.

Pivot devices 30 may be constructed using pivot bearing 32 and pivot member 38, that are coupled to each other. Pivot bearing 32 is firmly set in each of uplifted portions 14a of main body 14. Pivot member 38 consists of a flat mount part and pivot shaft 34. The flat mount part of the pivot member 38 is provided with a plurality of holes 36, through which pivot member 38 is attached by screws to one end of protrusion 24 of display housing 22. Pivot shaft 34 is rotatably inserted into a shaft hole of pivot bearing 32, thus allowing pivot member 38 to be rotatable relative to pivot bearing 32.

Display body 16 is hinged to the rear edge of main body 14 by two pivot members 38, that are interiorly mounted to each end of protrusion 24 of display housing 22 using a plurality of set screws 40. To secure the display body to the main body, pivot shaft 34 is rotatably inserted into the shaft hole of pivot bearing 32.

Figure 3:
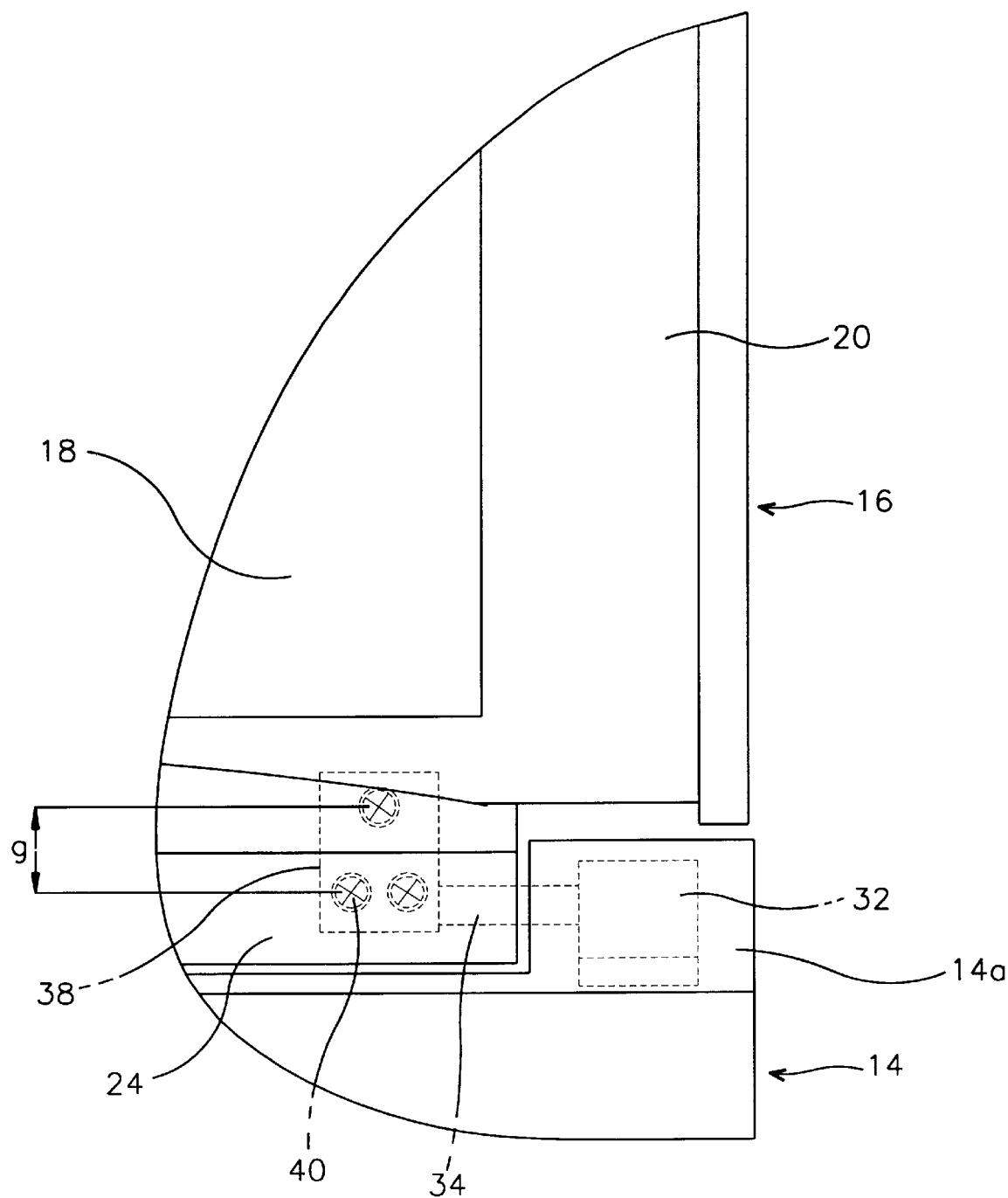
FIG. 3 is a front view of the pivot device of FIG. 2, with the pivot member and the pivot bearing of the pivot device being shown in a proper location for operating the portable computer.

FIG. 3 illustrates the two elements 32 and 38 of the pivot device 30 aligned in their appropriate orientation to be affixed to both the main body and the display body. The gap denoted "g" illustrates the distance between the rotating axis of pivot shaft 34 and the screw that is used to secure the display body to pivot member 38 that is furthest away from the axis of pivot shaft 34.

Figure 4:
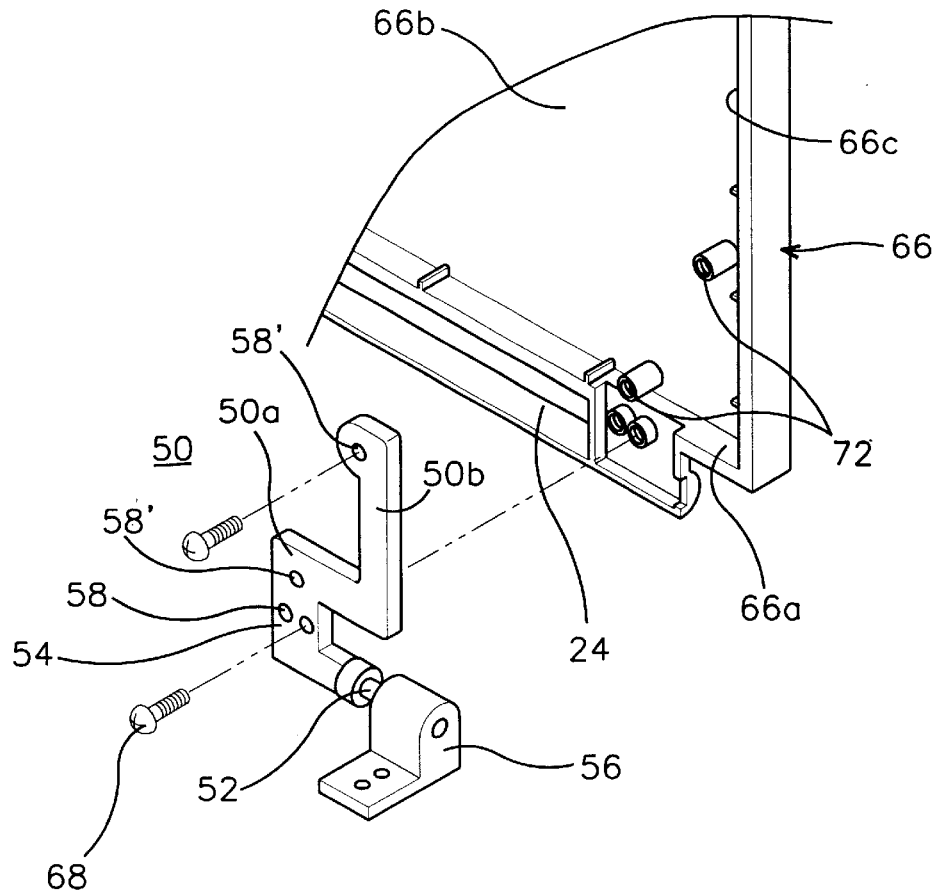
FIG. 4 is an exploded perspective view of a first embodiment of a pivot device for portable computers as constructed in accordance with the principles of the present invention.
Figure 5:
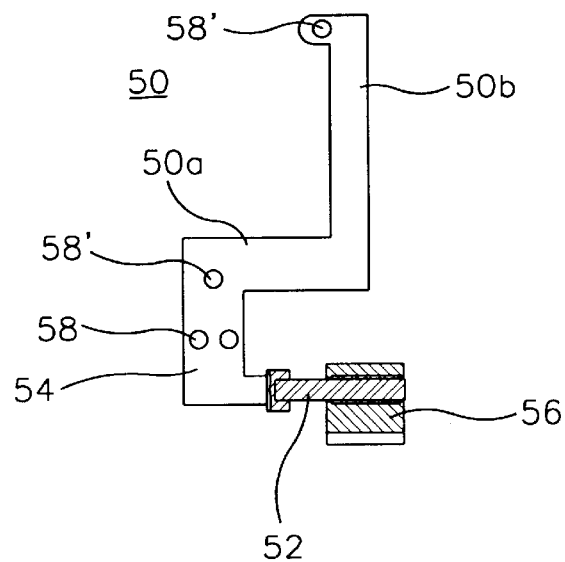
FIG. 5 is a front view of the pivot device of FIG. 4, with the pivot member and the pivot bearing of the pivot device being coupled together.
Figure 6:
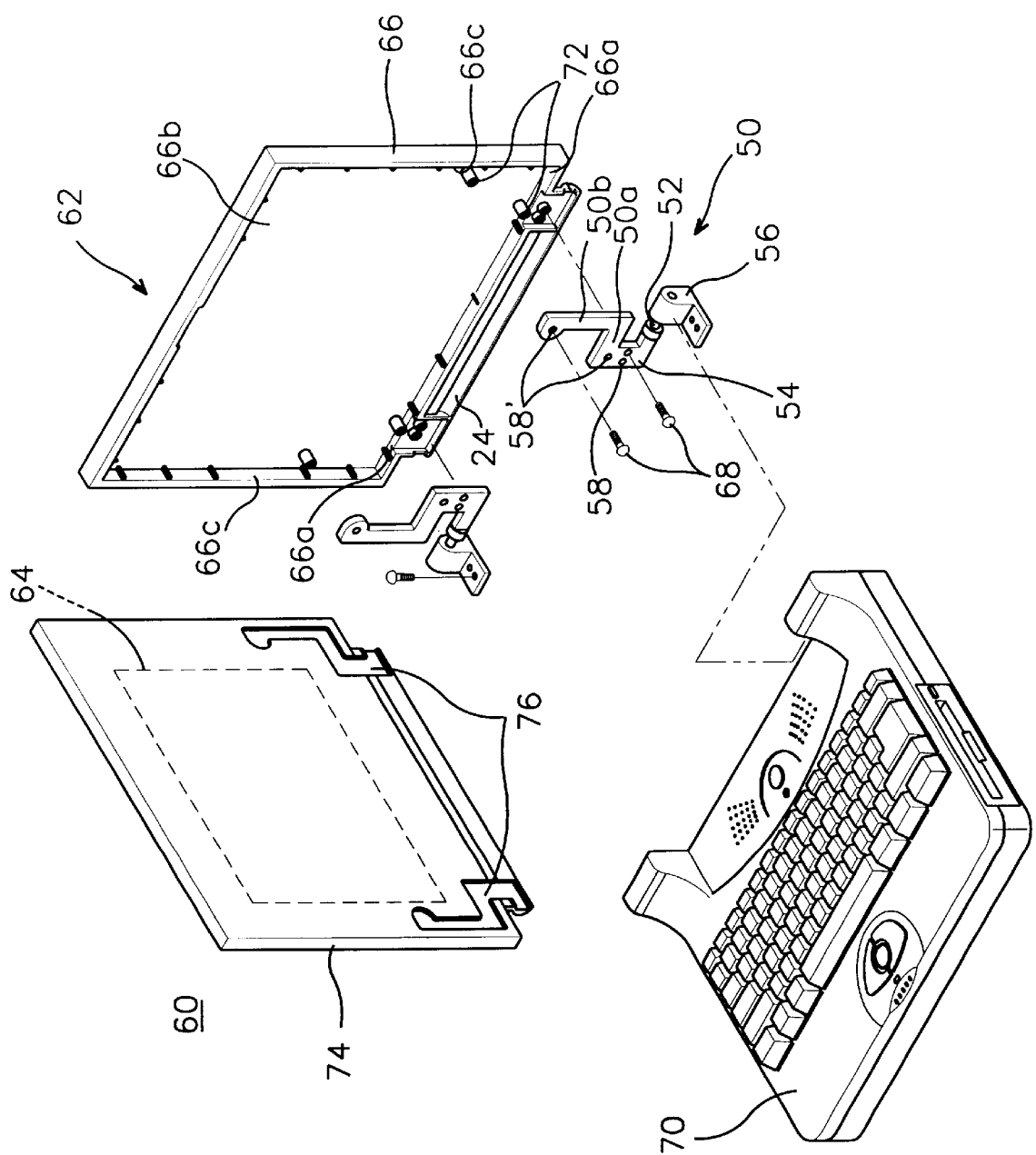
FIG. 6 is an exploded perspective view of a portable computer, showing the assembly of a portable computer using the pivot device of FIG. 4.

FIG. 4 illustrates a pivot device as constructed according to the principles of the present invention. FIG. 5 illustrates a front view of the pivot member of FIG. 4. Pivot device 50 may be constructed using pivot bearing 56 and a pivot member 50 that is coupled to pivot bearing 56. One pivot bearing 56 is firmly set in each of the uplifted portions of the portable computer's main body 70 (FIG. 6). The pivot member may be constructed using mount part 54 and pivot shaft 52. Pivot shaft 52 is rotatably inserted into a shaft hole of pivot bearing 56, thus allowing the pivot member to be rotated relative to pivot bearing 56. Mount part 54 of the pivot member may be constructed using both lower support part 50a and side support part 50b. The lower portion of lower support part 50a is integrated with pivot shaft 52 and supports lower portion 66a of display housing 66. Lower support part 50a extends outwardly for a predetermined length in parallel to the pivot shaft 52. Side support part 50b extends axially away from pivot shaft 52 and fastens to side wall 66c of display housing 66. Thus, side support part 50b supports the side portion of display housing 66.

The outside end portion of pivot shaft 52 has a cylindrical configuration suitable for being rotatably coupled to pivot bearing 56 of the computer's main body 70. Mount part 54 of the pivot member is provided with plurality of holes 58, through which the pivot member may be fastened to the interior of display housing 66.

As shown in FIG. 6, mount part 54 of the pivot member is mounted to the interior of protrusion 24 of display housing 66 using plurality of fasteners 68, while pivot shaft 52 is rotatably inserted into the shaft hole of pivot bearing 56 that is firmly set in one of the uplifted portions of the computer's main body 70. In addition, lower support part 50a of mount part 54 extends to a predetermined length in a direction parallel to pivot shaft 52. Lower support part 50a is mounted to boss 72, that is located on surface 66b of display housing 66 along a lower portion.

Side support part 50b is used for supporting the side portion of display housing 66. Side support 50b extends from the lower support part 50a out along a direction parallel to side wall 66c of display housing 66. Side support part 50b is mounted to another boss 72, that is located on surface 66b of display housing 66 along a side portion, using fastener 68.

Lower support part 50a is wider than the side support part 50b. The two support parts 50a and 50b respectively have holes 58 at positions corresponding to bosses 72, to facilitate the mounting of the display body to the pivot members. Lower and side support parts 50a and 50b of the pivot member's mount part 54 firmly support the lower and side portions of the display housing 66, thus more effectively distributing the weight of the LCD panel 64 acting on the rotating axis X of the pivot shaft 52.

Figure 7:
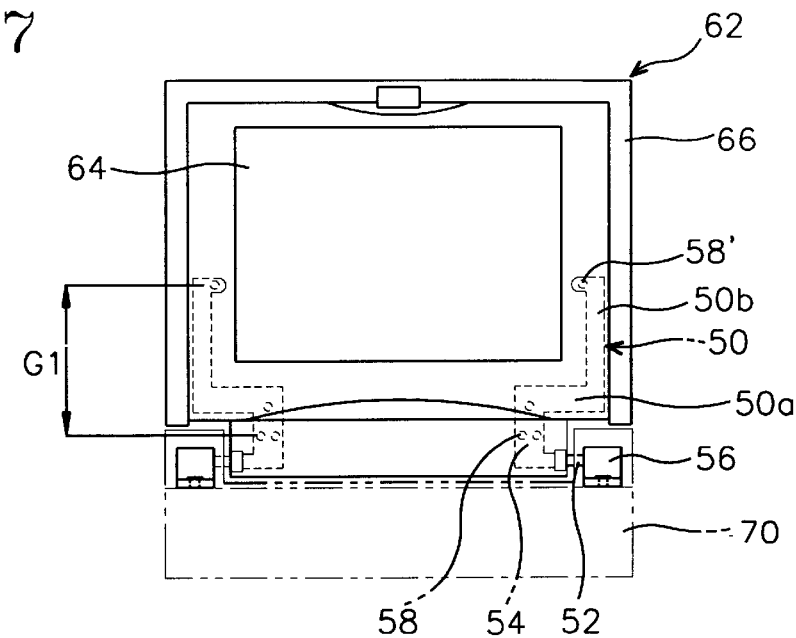
FIG. 7 is a front view showing the pivot device of FIG. 6, with the pivot member and the pivot bearing of the pivot device being shown in a proper location for operating the portable computer.

Front panel 74 of display body 62 has groove 76 on its interior surface at a position that corresponds to mount part 54 of each pivot member. Groove 76 has the same configuration as that of mount part 54, allowing mount part 54 to fit precisely into groove 76. Groove 76 has a depth corresponding to the thickness of mount part 54, thus display body 62 does not have its thickness increased by mount part 54. FIG. 7 illustrates the pivot device of FIG. 6, with the pivot member and the pivot bearing oriented in the proper place for securing the pivot device to the portable computer. Display body 62 is hinged to the rear edge of main body 70 by the pivot member, that is interiorly mounted to each end of the lower portion of display housing 66 using plurality of fasteners 68. The lower and side support parts 50a and 50b of the pivot member's mount part 54 are firmly mounted to the lower and side portions of display housing 66 using plurality of fasteners 68.

In pivot device 50, according to one embodiment of the present invention, the gap denoted "G1" between the rotating axis X1 of the pivot shaft 52 and the position of the most remote fastener that secures the display body to the pivot device is remarkably longer than the gap denoted "g" in FIG. 3. This reduces the deformation of the display body during the opening and closing of the portabale computer.

Figure 8:
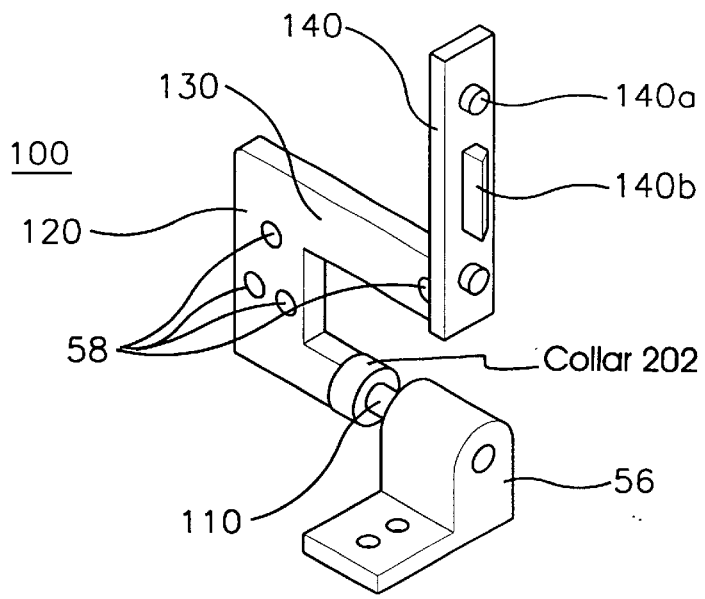
FIG. 8 is a perspective view of a second embodiment of a pivot device for portable computers as constructed in accordance with the principles of the present invention.

FIG. 8 illustrates a second embodiment of the present invention. A pivot device for portable computers may be constructed using pivot bearing 56 and a pivot member that is coupled to the pivot bearing. One pivot bearing 56 is firmly set in each of the uplifted portions of the computer's main body 70, while the pivot member consists of mount part 120 and pivot shaft 110, with a collar 202. Pivot shaft 110 is rotatably inserted into a shaft hole of pivot bearing 56. Mount part 120 of the pivot member consists of both lower support part 130 and side support part 140. The lower portion of lower support part 130 is integrated with pivot shaft 110, with the collar 202 and supports the lower portion 66a of the display housing 66. Side support part 140 outwardly extends from the outside end of lower support part 130 in a direction parallel to side wall 66c of display housing 66. This allows the side support part to further support the side portion of display housing 66.

Pivot shaft 110 has a cylindrical configuration suitable for being rotatably coupled to the pivot bearing 56 of the computer's main body 70. Mount part 120 of the pivot member is provided with a plurality of holes 58, through which the pivot member is fastened to the interior of the lower portion of display housing 66.

Figure 9:
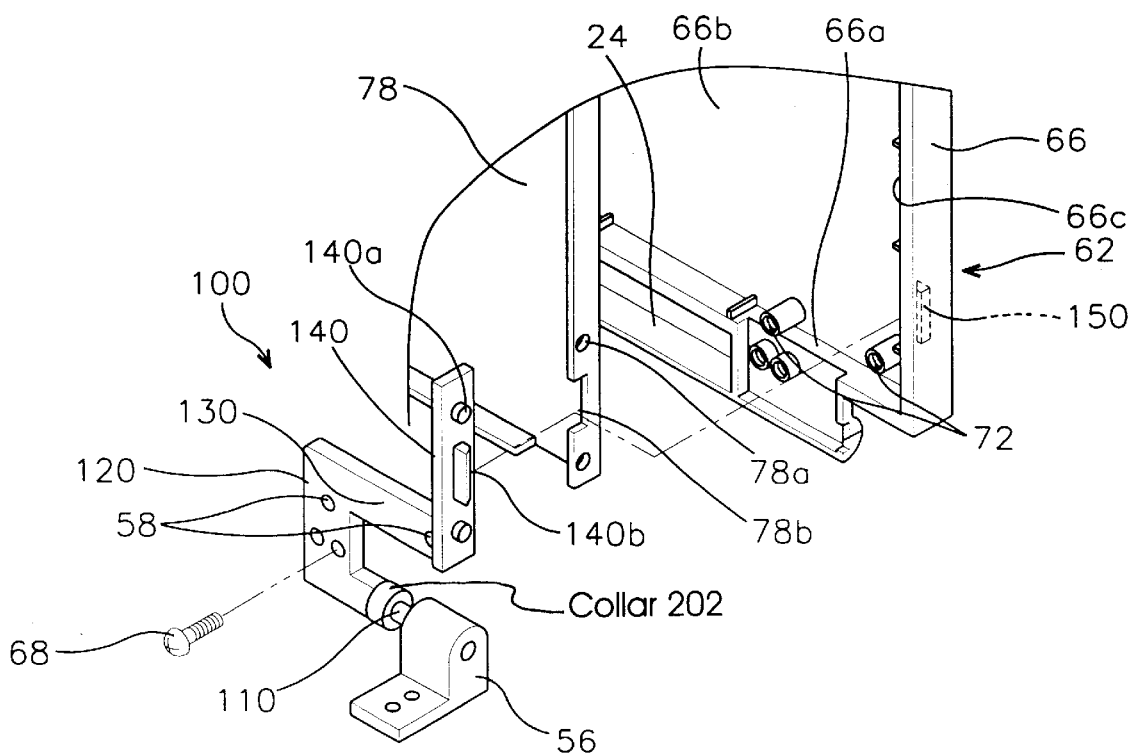
FIG. 9 is an exploded perspective view of the pivot device of FIG. 8.

As shown in FIG. 9, mount part 120 of the pivot member is interiorly mounted to protrusion 24 of display housing 66 using a plurality of fasteners 68, while pivot shaft 110 is rotatably inserted into the shaft hole of pivot bearing 56 that is firmly set in each of the uplifted portions of main body 70. Additionally, lower support part 130 of mount part 120 is mounted to lower portion 66a of the display housing 66 using a plurality of fasteners 68. Meanwhile, side support part 140, extends vertically and upwardly from lower support part 130 and is fitted into side wall 66c of display housing 66. The lower support part 130 of mount part 120 extends outwardly along the lower portion 66a of display housing 66 parallel to pivot shaft 110 at its upper portion and is mounted to a boss 72, thus supporting the display housing 66 in a horizontal direction. Side support part 140, extends vertically and upwardly from the outside end of lower support part 130 along side wall 66c of display housing 66, and is fastened to side wall 66c of display housing 66, thus supporting display housing 66.

Furthermore, the outside wall of side support part 140 has at least one guide pin 140a, that is fitted into the side wall of shield plate 78 of display body 62. The side support part 140 also has at least one hook 140b at the outside wall that passes through shield plate 78 prior to being caught by side wall 66c of display housing 66. To engage side support part 140 and shield plate 78 of display body 62, there is both at least one pin insert hole 78a and a cutout 78b on the side wall. The pin insert hole 78a allows guide pin 140a of side support part 140 to pass through, while cutout 78b guides hook 140b of side support part 140. Hook stopper 150 is interiorly formed on side wall 66c of display housing 66 at a position corresponding to cutout 78b, thus being brought into engagement with hook 140b that passes through cutout 78b.

Front panel 74 of the display body 62, such as illustrated in FIG. 6, has groove 76 on its interior surface at a position that corresponds to mount part 120 of each pivot member. Groove 76 has the same configuration as that of mount part 120, and may be constructed using lower and side support parts 130 and 140, and has a depth corresponding to the thickness of the mount part 120, so that display body 62 does not have an increased thickness.

Figure 10:
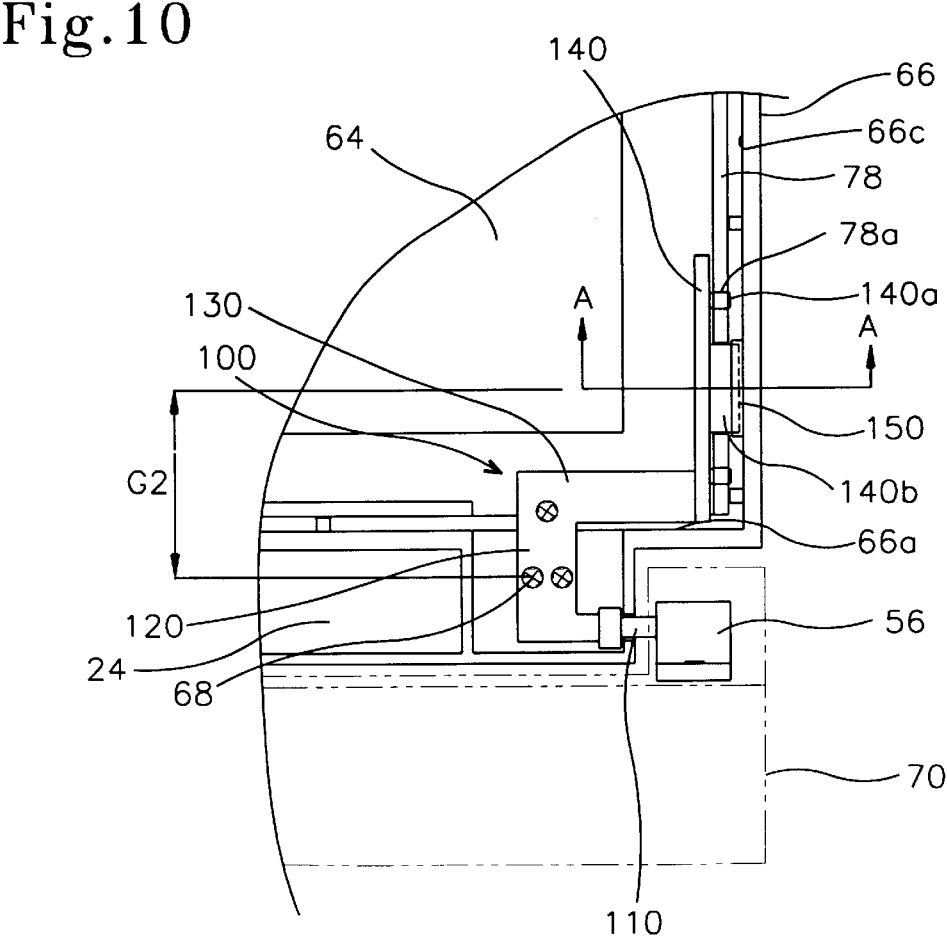
FIG. 10 is a front view of the pivot device of FIG. 9, with the pivot member and the pivot bearing of the pivot device being assembled with a display body.
Figure 11:
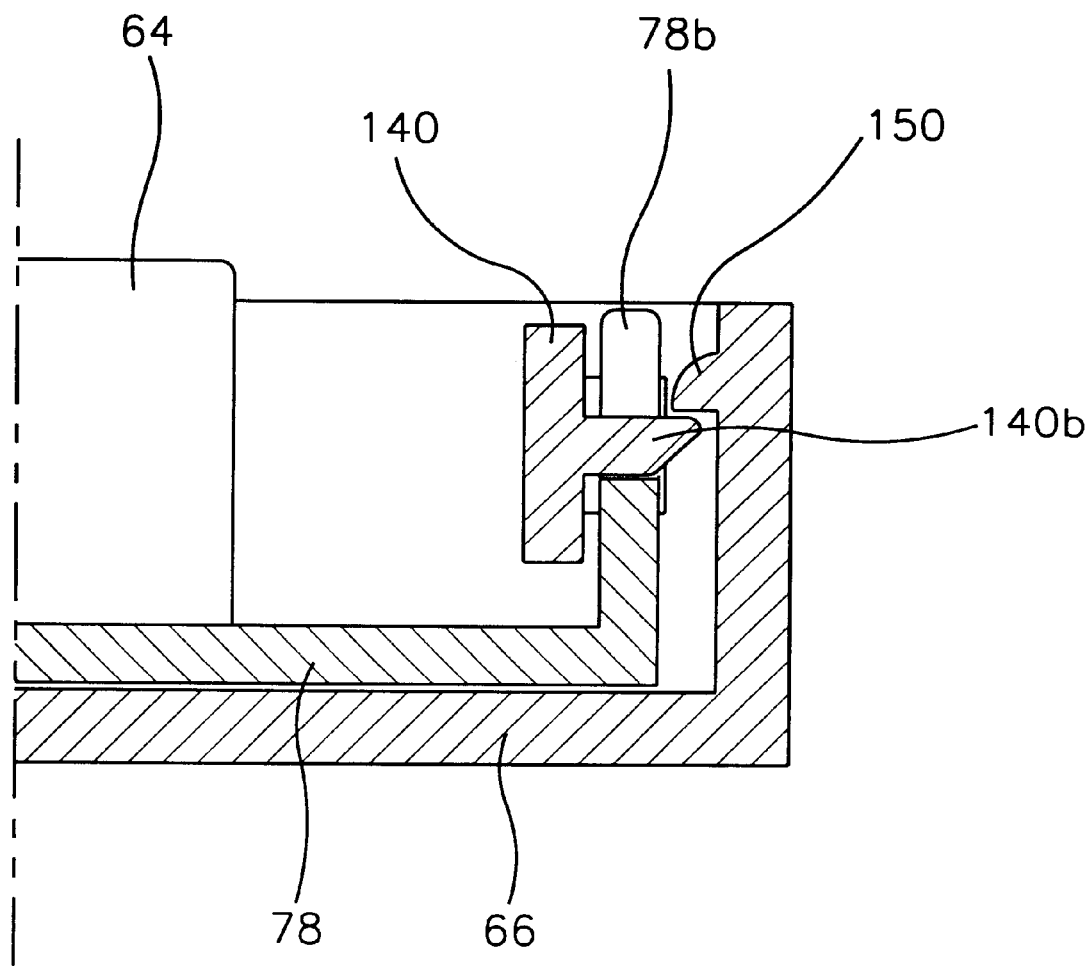
FIG. 11 is a cross-sectional view of the pivot device of FIG. 10 taken along the line A—A.

FIG. 10 illustrates the pivot member and the pivot bearing of pivot device 100 arranged in their installed position on a portable computer. FIG. 11 is a sectional view of the pivot device 100 taken along the line A—A of FIG. 10. As shown in the drawings of FIGS. 10 and 11, display body 62 is hinged to the rear edge of main body 70 by the pivot member as constructed according to the second embodiment of the present invention. That is, mount part 120 of the pivot member is interiorly mounted to each end of the lower portion of the display housing 66 using a plurality of set screws 68, while pivot shaft 110 is rotatably inserted into the shaft hole of pivot bearing 56.

Side support part 140 of mount part 120 passes through shield plate 78 of display body 62 prior to being interiorly caught by the side wall 66c of the display housing 66. That is, guide pin 140a of side support part 140 is inserted into pin insert hole or aperture 78a of shield plate 78, while hook 140b of the side support part passes through cutout 78b of the shield plate 78. Thus, side support part 140 is brought into engagement with side wall 66c of display body 66.

The gap "G2" between the rotating axis X2 of the pivot shaft 110 and the fastener connecting the pivot member to the display body at the farthest point from the pivot device's axis of rotation is remarkably longer than that denoted "g" in the pivot device of FIG. 3.

As described above, the present invention provides a pivot device for portable computers. The pivot device uses a pivot member that effectively distributes the weight of the display body, that effectively prevents the pivot shaft of the pivot member from being overloaded by the weight of the display body even when the display body is equipped with a large-sized LCD panel, and that prevents the display housing from being unexpectedly distorted or deformed during an opening or closing action of the display body.

Since the pivot device prevents the display housing from being unexpectedly distorted or deformed during an opening or closing action of the display body, the pivot device prevents any gap between the LCD panel and the front panel, prevents any vibrations and fatigue fracture of the pivot member, and improves the strength of the display housing.

Although preferred embodiments of the present invention have been disclosed for illustrative purposes, those skilled in the art will appreciate that various modifications, additions and substitutions are possible, without departing from the scope and spirit of the invention as disclosed in the accompanying claims. It is also possible that other benefits or uses of the currently disclosed invention will become apparent over time.

What is claimed is:

1. A pivot device for a portable computer, comprising:
    a pivot bearing for pivotally mounting a display unit to a main body of a portable computer; and
    a pivot member for rotatable mounting by a pivot shaft to said pivot bearing, said pivot member comprising:
        a lower support part that extends for a predetermined length in parallel relation to said pivot shaft, said lower support part for mounting to a lower portion of said display unit; and
        a side support part that extends a predetermined length from said lower support part in a direction from said pivot bearing so as to fastenably attach with a lateral side of said display unit at a location other than at said lower portion of said display unit, said lower support part and said side support part for being received in a corresponding groove in said display unit, said corresponding groove having a configuration corresponding to a configuration of said pivot member for receiving in said corresponding groove said pivot member.

2. The pivot device of claim 1, further comprised of said lower support part having a U-shape.

3. The pivot device of claim 2, further comprised of said side support part having an L-shape.

4. The pivot device of claim 1, further comprised of a pair of said pivot bearing for being positioned in opposing relation for pivotally mounting said display unit to said main body of said portable computer, and a pair of said pivot member, each said pivot member for being rotatably mounted by a corresponding said pivot shaft to a corresponding said pivot bearing of said pair of said pivot bearing, and a pair of said corresponding groove, each said corresponding groove for receiving a corresponding one of said pair of said pivot member.

5. The pivot device of claim 1, further comprised of said lower support part of said pivot member for mounting to said lower portion of said display unit by using a fastener.

6. A pivot device for a portable computer, comprising:
   a pivot bearing for location at a rear edge of a main body of a portable computer; and
   a pivot member for rotatable coupling by a pivot shaft to said pivot bearing for rotatably connecting a display body to said main body, said pivot member comprising:
      a lower support part that extends for a predetermined length in parallel relation to said pivot shaft, said lower support part for mounting to a lower portion of said display body; and
      a side support part that sends form said lower support part for a predetermined length so as to be caught and held by a side wall of said display body at a location other than at said lower portion of said display body, said display body having a corresponding groove having a configuration corresponding to said pivot member for receiving in said corresponding groove said pivot member.

7. The pivot device as claimed in claim 6, further comprised of said side support part having a hook for latchably engaging with a hook stopper located on said side wall of said display body.

8. A portable computer, comprising:
   a main body housing a central processing unit;
   a display body housing a liquid crystal display panel; and
   a pivot device mounted on said main body at the junction between said main body and said display body to rotatably connect the display body to the main body, thus allowing the display body to be rotatably openable relative to the main body, said pivot device comprising:
      a pivot bearing provided at a rear edge of said main body; and
      a pivot member provided on said display body and rotatably coupled by a pivot shaft to said pivot bearing, said pivot member comprising:
         a lower support part mounted to a lower portion of said display body, said lower support part extending for a predetermined length in parallel relation to said pivot shaft; and
         a side support part extending from said lower support part for a predetermined length and mounted to a side portion of said display body at a location other than at said lower portion of said display body, said lower support part and said side support part for being received in a corresponding groove in said display body, said corresponding groove having a configuration corresponding to a configuration of said pivot member for receiving in said corresponding groove said pivot member.

9. The portable computer of claim 8, further comprised of said lower support part being wider than said side support part.

10. The portable computer of claim 8, further comprised of said lower support part of said pivot member being mounted to said lower portion of said display body using a fastener.

11. The portable computer of claim 8, further comprised of said lower support part having a U-shape.

12. The portable computer of claim 11, further comprised of said side support part having an L-shape.

13. A portable computer, comprising:
   a main body carrying a central processing unit;
   a display body carrying a liquid crystal display panel; and
   a pivot device provided at a junction between said main body and said display body to rotatably connect said display body to said in body, said pivot device allowing said display body to be rotatably openable relative to said man body, said pivot device comprising:
      a pivot bearing provided at a rear edge of said main body; and
      a pivot member provided on said display body and rotatably coupled by a pivot shaft to said pivot bearing, said pivot member comprising a lower support part mounted to a lower portion of said display body, said lower support part extending for a predetermined length in parallel portion to said pivot shaft, and a side support part extending from said lower support part for a predetermined length and caught and held by a side wall of said display body at a location other than at said lower portion of said display body, said display body having a corresponding groove having a configuration corresponding to said pivot member for receiving in said corresponding groove said pivot member.

14. The portable computer of claim 13, further comprised of said side support part having a hook for latchably engaging said side wall of said display body.

15. The portable computer of claim 14, further comprised of said lower support part of said pivot member being mounted to said lower portion of said display body using a fastener.

16. The portable computer of claim 14, further comprising a hook stopper formed on said side wall of said display body at a position corresponding to said hook of said side support part, said hook stopper thus being engageable with said hook.

17. The portable computer of claim 16, further comprised of said display body having a shield plate, said side support part having a guide pin for insertion into an aperture in said shield plate and said side support part being brought into engagement with said side wall of said display body.

18. The portable computer of claim 13, further comprised of said lower support part of said pivot member being mounted to said lower portion of said display body using a fastener.

* * * * *